Dec. 5, 1939.   J. F. BOLTON ET AL   2,182,579
FLEXIBLE SUPPORTING CONNECTION
Filed Nov. 21, 1936
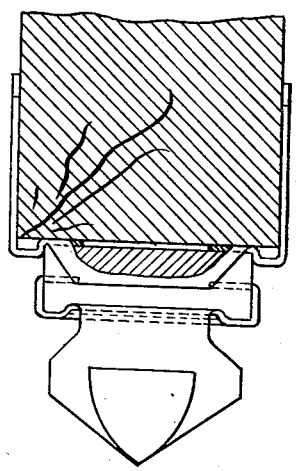
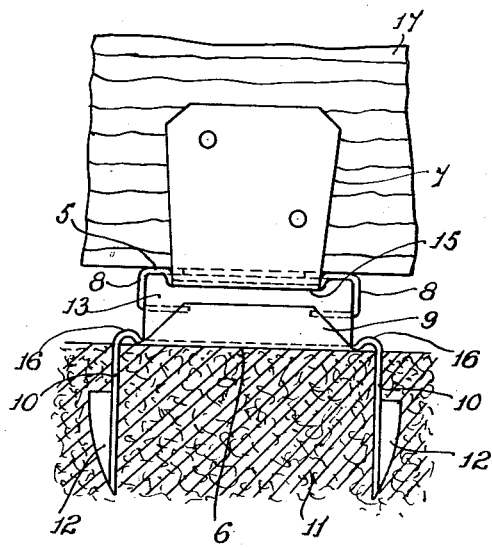
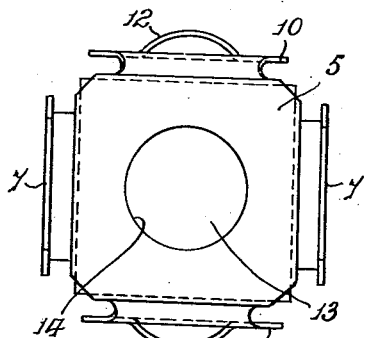
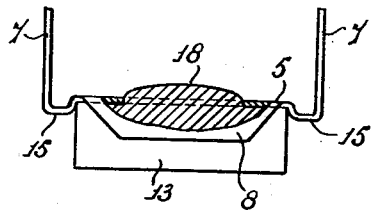
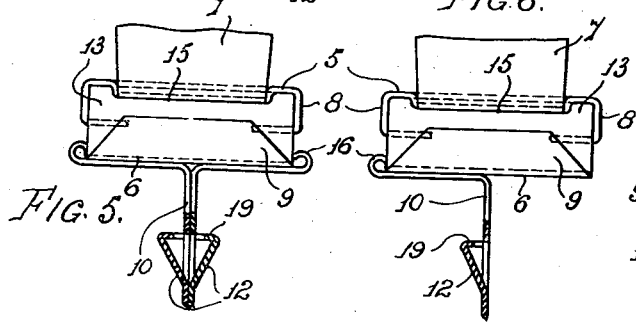
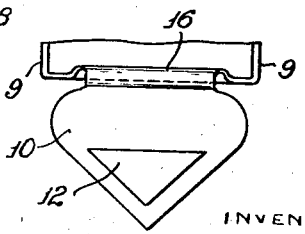
INVENTORS:
JOHN FLETCHER BOLTON
ARTHUR BIRCH
BY: Francis E. Boyce
ATTORNEY Patented Dec. 5, 1939

2,182,579

UNITED STATES PATENT OFFICE 2,182,579

FLEXIBLE SUPPORTING CONNECTION

John Fletcher Bolton and Arthur Birch, Bolton, England

Application November 21, 1936, Serial No. 112,006
In Great Britain April 8, 1936

5 Claims. (Cl. 72—101)

This invention has reference to flexible supports or connections for use in building structures, and relates more particularly to flexible supports and connections having vibration damping properties and which will be especially useful in preventing the transmission of sound from a wood floor to concrete floor by which it is supported.

It is well known that in transmitting vibration such as sound waves a hard substance such as metal is more effective than a soft substance and conversely a soft substance is more effective in preventing the transmission of such waves. Many soft substances themselves transmit vibrations if drawn tight, and easily become distorted and after a time harden or perish.

In modern building construction wherever ferro-concrete floors and walls are used the transmission of vibrations, such as sounds, becomes so highly efficient that it constitutes a nuisance, steps on a floor being clearly heard below, and a knock on a wall being heard quite a long distance and even if wood floors are laid on joists on the concrete they act as drums and the transmission of sound is just as definite.

To eliminate this vibration it has been proposed to use pads of various materials of a soft nature, such as felt or rubber between the two parts or members, but hitherto a difficulty has been experienced in connecting the pads to the parts to be connected in a manner which effects a secure joint and at the same time eliminates the possibility of contact between any hard connecting or securing parts or members, which contact if occurring would largely defeat the object. A further difficulty is that substances such as felt or asbestos cannot be used in the presence of water, such as in wet concrete as by absorption they harden and lose their effectiveness.

The present invention has for its object to provide an improved flexible support or connection which will be highly effective in its primary function and will also prevent very largely if not entirely the transmission of vibration from one member to the other. The term "flexible" as herein used is to be considered as excluding metallic flexible members such as springs, and is to be considered more in the sense of meaning "non-rigid" and "resilient".

A flexible support or connection according to this invention comprises a block of non-fibrous non-rigid and resilient material, having bad vibration transmitting properties, such as rubber, gripped below by a holding member embedded in the concrete and gripped above by an attaching member to which a wood joist can be secured, the embedded member in the concrete and the attaching member above engaging the block at different places which prevent any contact between such members.

The invention is more particularly set forth with reference to the accompanying drawing wherein—

Fig. 1 is an elevation partly in section showing one form of support according to the invention with a beam in place.

Fig. 2 is an elevation at right angles to Fig. 1 showing the support in position in the concrete.

Fig. 3 is a plan.

Fig. 4 is a part sectional elevation of an alternative arrangement.

Figs. 5 and 6 are part sectional elevations of two other constructions.

Fig. 7 is a front elevation of an alternative form of fang.

The invention as shown in Figs. 1, 2 and 3 comprises a metal cradle 5 and a fang member 6 both conveniently made from sheet metal, and each, when laid flat, being of cruciform shape, and having two long arms and two short arms.

The long arms 7 of the cradle 5 are bent up, and the short arms 8 are bent down and inward, and the short arms 9 of the fang member 6 are bent up and inward while the long arms or fangs 10 are bent down. These arms or fangs 10 are pointed and are provided with projections or key openings to form a sound engagement with the concrete 11 in which they are embedded. Preferably the engaging means is in the form shown in the drawing and comprises a bulged shield-shaped portion 12 which allows the fangs to be driven into the concrete 11 even if it has hardened, but which, when driven in and packed from above, cannot be removed.

The respective short arms 8 and 9 are as already stated turned inwardly and are received in slots in the edges of a block of rubber 13, which is held from opposite sides by the top and bottom short arms so that the whole device forms a single unit. The flat face of the cradle 5 has, as shown in Fig. 3 a central hole 14, and the long arms 7 and 10 are bent slightly downward and upward respectively as indicated at 15 and 16. The purpose of these bends 15 and 16 is to prevent the rubber 13 from spreading at these places when subjected to a weight, the only place left for the rubber to expand through, being the hole 14 which thus allows it to rise under the beam 17 and act as a pad thereto. In Fig. 4 a slight modification is shown wherein the block 13 has a projection 18 formed upon it to project through the opening to form a support on which the beam may rest.

Supports made in this way may be inserted in concrete while soft, or they may be driven into holes formed in the concrete after it has set, and then packed in, and the beams are laid in the cradles and secured by nails or screws passing through holes in the arms 7.

In Figs. 5 and 6 the fang members 10 are under the centre of the cradle 6. In Fig. 5 two such members are shown and in Fig. 6 one is shown, and either form may be used, this central arrangement making it easier to force the fangs into concrete or other substance or member on which the supports are mounted.

In Figs. 5, 6 and 7 a slightly modified form of fang is shown, which has a greater width than depth, thus giving a greater resistance to the material such as concrete above the shield-shaped projection 12 and to this end and also to strengthen the whole, the top edge may be turned inwardly as at 19. Fangs made with the shield-shaped projection 12 as shown in Figs. 5, 6 and 7 may be used with supports as shown in Figs. 1, 2 and 3.

Owing to the fact that the pad 13 is water resisting, rubber being the preferred material, it retains its impervious and resilient condition and does not absorb water thus acting as a damper to any vibration which it may experience as the result of a movement of a body on a floor laid on the beams.

When the invention is used for supporting one beam or joist over another, the lower member may be secured to the lower joist by nails or screws driven through the fangs lying down the sides of the joist or the fangs may be flattened out to lie upon the top.

While the term cradle has been used it is to be understood that this includes any equivalent holding means between the joist and the rubber block.

While the invention has been described with reference to the use of rubber as the vibration insulating material, a rubber substitute may be used, providing it has the necessary qualities set out earlier herein.

What we claim as our invention and desire to secure by Letters Patent is:

1. A flexible support for a wood floor upon a concrete floor bed, comprising a solid block of india-rubber having slits at opposite side edges thereof, a metal grip holding said block below and also holding in said concrete, a metal cradle above said block for attachment to a floor joist, said metal cradle having inturned fang edges engaging the slits at opposite sides of the block.

2. A flexible support for a wood floor upon a concrete floor bed, comprising a solid block of india-rubber having slits in opposite edges thereof, a metal cradle member having inturned fang edges embedded in said slits, said cradle extending upward therefrom to engage a joist in said wood floor, a second pair of slits in said block at right angles to said first slits, a metal concrete-engaging member for burying in the concrete floor bed and having inturned fang edges embedded in said second slits in said block.

3. A floor support, comprising a solid block of flexible material, an underlying anchoring member and an overlying cradle member extending over the entire surface of the block respectively below and above the same, each of said anchoring and cradle members having at two opposite edges a pair of depending arms and at two edges at right angles to said first edges a pair of upwardly extending arms, the upward arms of the anchoring member and the depending arms of the cradle member being bent inward at their ends and engaging slits in the edges of said block, the depending arms of the anchoring member being curved upward at the juncture thereof with the anchoring member and the upward arms of the cradle member being curved downward at the juncture thereof with the cradle thereby to restrict lateral spreading of the block under pressure.

4. A flexible support for a wood floor upon a concrete floor bed, comprising a solid rectangular block of india-rubber, a top cradle member for attachment to a joist in said wood floor, and having a body portion overlying said block, inturned fang edges carried by and embedded in opposite edges of said block, said body portion having a centrally disposed opening therein and said block having a part projecting upwardly through said opening and forming a pad for the joist to which the cradle is attached.

5. A flexible support for securing a wood floor to a concrete bed, comprising a solid rectangular block of rubber having slots extending inward from its four edges, a metallic member having means engaging two oppositely disposed slots in said block and provided with means extending above said block for attachment to a floor beam, and a metallic member having means engaging the remaining oppositely disposed slots in the block and provided with means extending below said block for anchoring said member in the concrete bed, said slots being spaced apart to prevent contact of any one of said engaging means with any of the others.

JOHN FLETCHER BOLTON.
ARTHUR BIRCH.